United States Patent
Vergossen et al.

(10) Patent No.: US 10,784,484 B2
(45) Date of Patent: Sep. 22, 2020

(54) CONNECTING ELEMENT, CURRENT-COLLECTING DEVICE AND ASSOCIATED PRODUCTION METHOD

(71) Applicant: AUDI AG, Ingolstadt (DE)

(72) Inventors: David Vergossen, Neuburg an der Donau (DE); Heiner Fees, Bietigheim-Bissingen (DE); Andreas Track, Sachsenheim (DE); Ralf Maisch, Abstatt (DE); Alexander Eichhorn, Eppingen (DE)

(73) Assignee: AUDI AG, Ingolstadt (DE)

( * ) Notice: Subject to any disclaimer, the term of this patent is extended or adjusted under 35 U.S.C. 154(b) by 309 days.

(21) Appl. No.: 15/531,028

(22) PCT Filed: Nov. 27, 2015

(86) PCT No.: PCT/EP2015/077870
§ 371 (c)(1),
(2) Date: May 26, 2017

(87) PCT Pub. No.: WO2016/083557
PCT Pub. Date: Jun. 2, 2016

(65) Prior Publication Data
US 2017/0317330 A1    Nov. 2, 2017

(30) Foreign Application Priority Data
Nov. 27, 2014   (DE) .................. 10 2014 017 622

(51) Int. Cl.
*B23K 11/00*     (2006.01)
*H01M 2/20*      (2006.01)
(Continued)

(52) U.S. Cl.
CPC .......... *H01M 2/202* (2013.01); *B23K 11/002* (2013.01); *H01M 2/34* (2013.01);
(Continued)

(58) Field of Classification Search
None
See application file for complete search history.

(56) References Cited

U.S. PATENT DOCUMENTS 6,377,432 B1    4/2002   Hashimoto
2008/0241667 A1*  10/2008   Kohn .................. H01M 2/1016
429/159
(Continued)

FOREIGN PATENT DOCUMENTS

CN      201054368 Y     4/2008
CN      201845821 U     5/2011
(Continued)

OTHER PUBLICATIONS

DE1921572U—Machine translation (Year: 1965).*
(Continued)

*Primary Examiner* — Haroon S. Sheikh
(74) *Attorney, Agent, or Firm* — Maier & Maier, PLLC

(57) ABSTRACT

A connecting element for at least two energy storage cells, having a metal sheet for the electrical connection of the energy storage cells. The metal sheet has at least two perforations for the uptake in each perforation of at least a part of an energy storage cell. Two lugs provided on the metal sheet project into the perforations.

11 Claims, 3 Drawing Sheets

(51) Int. Cl.
  *H01M 2/34* (2006.01)
  *H01R 13/24* (2006.01)
(52) U.S. Cl.
  CPC ..... *H01R 13/2442* (2013.01); *H01R 13/2478* (2013.01); *H01M 2200/103* (2013.01); *H01R 13/2492* (2013.01)

(56) References Cited

U.S. PATENT DOCUMENTS

| | | | | |
|---|---|---|---|---|
| 2011/0151285 A1* | 6/2011 | Hong | ............... | H01M 2/105 429/7 |
| 2011/0177373 A1 | 7/2011 | Pellenc | | |
| 2013/0089996 A1 | 4/2013 | Zhao | | |
| 2015/0380713 A1* | 12/2015 | Kimura | ............... | H01G 11/10 429/121 |
| 2016/0073506 A1* | 3/2016 | Coakley | ............... | H01M 2/202 |

FOREIGN PATENT DOCUMENTS

| | | |
|---|---|---|
| CN | 202817065 U | 3/2013 |
| CN | 103715386 A | 4/2014 |
| CN | 104134774 A | 11/2014 |
| DE | 1921572 U | 8/1965 |
| DE | 2207776 A1 | 8/1972 |
| DE | 102010019935 A1 | 11/2011 |
| DE | 102010044455 A1 | 3/2012 |
| DE | 102011052569 A1 | 2/2013 |
| EP | 1691431 A1 | 8/2006 |
| EP | 1780819 A1 | 5/2007 |
| EP | 2230705 A1 | 9/2010 |
| JP | 2000106170 A | 4/2000 |
| WO | 2011/038908 A1 | 4/2011 |

OTHER PUBLICATIONS

Chinese Office Action dated Jan. 3, 2019, in connection with corresponding CN Application No. 201580064669.X (15 pgs., including machine-generated English translation).
International Search Report and Written Opinion dated Mar. 2, 2016 of corresponding application No. PCT/EP2015/077870; 12 pgs.
German Office Action dated Jul. 15, 2015 of corresponding application No. DE10 2014 017 622.3; 6 pgs.
Translation of the International Preliminary Report on Patentability dated Jun. 8, 2017, in connection with corresponding international Application No. PCT/EP2015/077870 (6 pgs.).

\* cited by examiner

CONNECTING ELEMENT, CURRENT-COLLECTING DEVICE AND ASSOCIATED PRODUCTION METHOD

BACKGROUND

The invention relates to a connecting element for at least two energy storage cells, having a metal sheet for electrically connecting the energy storage cells.

Connecting elements with which it is possible to electrically connect several energy storage cells, in particular battery cells, by means of a metal sheet are known from the prior art. A connecting element for the connecting of cells, which has two tongues or guides lying opposite one another, these guides being able to be connected to a corresponding pole of a cell via a connection site is known from EP1,691,431 A1. In this case, the guides of the connecting element are connected by welding to the respective pole of the cell.

In addition, producing a connection between connecting element and storage cell by laser welding methods or the bonding of a wire from a head of a cell pole onto the connecting element is known from the prior art. These methods have the disadvantage that they are, first of all, complicated and costly, and also that high contact resistances arise between connecting element and energy storage cell, which lead to an increased power loss, especially when the connecting element is contacted through the bonding of a wire.

SUMMARY OF THE DISCLOSURE

Thus, the object of the invention is to provide an effectively improved connecting element.

In order to achieve this object, for a connecting element of the type named initially, it is provided according to the invention that the metal sheet has at least two perforations for the uptake in each of them of at least a part of an energy storage cell, two lugs provided on the metal sheet projecting into each of the perforations.

The connecting element according to the invention is thus characterized in that, for electrically connecting to the energy storage cells, the metal sheet has perforations that are formed for the purpose of taking up the energy storage cells or at least a part of the energy storage cells, for example, the head of the cell.

According to the invention, two lugs project into each of the perforations. The lugs are preferably found at an upper edge of the metal sheet and project radially into the perforation. It is, of course, also possible to design the lugs in such a way that they project into the perforation in another way. Thus, deviating from an alignment of the lugs that is parallel to the surface of the metal sheet, it is also possible that the lugs are at an angle to the surface of the metal sheet.

The energy storage cells are introduced into the perforations on the side lying opposite to the lugs. The shape of the perforation can be adapted to the energy storage cells used or to the shape that will be assumed in the perforations. Preferably, round cells are used, so that the perforations have a circular shape. Deviating therefrom, in particular, a rectangular, square, or polygonal shape is conceivable.

The lugs are preferably produced in one piece with the metal sheet. This can be accomplished, for example, by punching out the perforation from the metal sheet, the lugs being punched in one piece with the metal sheet.

In an enhancement of the connecting element according to the invention, at least one lug has at least one depression. More preferably, each lug of the connecting element has such a depression. The depression is employed for the purpose of introducing a probe into one of the two lugs per perforation for welding the energy storage cell to the connecting element each time. By applying an electrical voltage, a current flows from one of the lugs to the other lug by producing the contact to the head of the energy storage cell by means of the probes that are introduced into the depressions. Due to the applied electrical voltage, the current flows between the two lugs via the cell head. With such a current flow, at least portions of the lugs fuse with the cell head and thus ensure a contacting of the cell head to the connecting element. Also, the depression can be produced here by stamping or punching out from the metal sheet.

Further, the lugs may have a protrusion on a side lying opposite the depression. This effectively improves the connecting element, in that the protrusion fuses with the head of the energy storage cell during a welding of the lugs. The current is selected here such that the depressions or the protrusions of the lugs fuse cohesively with the energy storage cell.

An enhancement of the connecting element according to the invention can consist of the circumstance that at least one lug has at least one constriction of its cross section. A fuse type of cut-out can be provided via this defined constriction of the cross section of the lug; this cut-out melts and thus interrupts the flow of current when the latter exceeds an admissible current that flows from the energy storage cell into the metal sheet. In this case, the constriction can be produced as a narrowing or material weakening of any form, for example, by a cavity or a perforation in the lug.

A preferred configuration of the connecting element may consist of the circumstance that at least one lug projects into the perforation with the formation of at least two radii. In this case, the lug can project first of all into the perforation in the plane of the metal sheet with formation of the radii. Also in this case, a fuse cut-out can be produced that melts and thus interrupts the flow of current when the current at the S-shape formed by the two radii is excessive. An arrangement of the lug that is perpendicular thereto, thus a perpendicular form of the two radii is also possible.

It is also possible to design the connecting element in such a way that it has at least two metal sheets joined together, in which the at least two perforations thereof are arranged coaxially, two lugs that project into the perforations being provided each time only on one metal sheet. In this embodiment, the connecting element is composed of at least two metal sheets that are joined together. Here, the metal sheets can be composed of the same material or different materials. In each case, the perforations of the metal sheets are arranged coaxially, so that the energy storage cells can be inserted into the perforations. In this case, only that metal sheet into which the energy storage cells have not been inserted has lugs.

It can be provided as an enhancement of the connecting element that at least one metal sheet has at least one recess for reducing mechanical stresses in the metal sheet. More preferably, but not exclusively, this is possible in an embodiment, in which the connecting element has at least two metal sheets and these are composed of different metals. A bimetal effect may be established that leads to mechanical stress in the connecting element due to a current flow through the energy storage cell or the lugs of the metal sheet or by heating the connecting element in another way. By the formation of at least one recess, this bimetal effect or the mechanical stress that is produced by the latter, can be reduced.

Alternatively, instead of the second continuous metal sheet, the connecting element may have at least one second metal sheet having a perforation that is disposed coaxial to a perforation of the first metal sheet, two lugs that project into the perforations being provided only on the second metal sheet.

Alternatively to the preceding embodiment, it can be provided that at least one second metal sheet having a perforation that is arranged coaxial to one of the perforations of the first metal sheet is arranged on the first, continuous metal sheet. Preferably, a second metal sheet is arranged at each perforation of the first metal sheet in this case. In particular, the second metal sheets have a circular shape that extends around the perforation of the first metal sheet. A bimetal effect may also be reduced in this way.

Preferably, at least one part of at least one metal sheet can be coated. For example, only the side of the lugs facing the energy storage cell can be coated. In this case, it is particularly advantageous to produce an equality of material between the surface of the lug and the surface of the energy storage cell. Accordingly, the metal sheet or the lugs should either be composed of the same material as the part of the energy storage cell that is inserted into the perforation, or should be coated therewith. Alternatively, of course, the energy storage cell can also be coated in such a way that there exists material equality between the lugs and the surface of the energy storage cell, to which the lugs shall be contacted.

In addition, the invention relates to a current-collecting device comprising at least two energy storage cells and at least one connecting element according to one of the preceding claims.

More preferably, the perforation of the connecting element is designed in such a way that an air gap is formed between the energy storage cells and the connecting element. This air gap represents an insulation layer that prevents a connection of the energy storage cell to the metal sheet in addition to the lugs. If the air gap is not present or is too small, a fuse cut-out provided optionally can no longer function, since after the melting of the cut-out, an electrical connection will also exist between the metal sheet and the energy storage cell. Therefore, the fuse cut-out will lose its effect. Preferably, in cases in which the air gap between energy storage cell and connecting element is designed to be small, the lug can be designed in such a way that it projects out beyond the perforation, thus out from the plane of the surface of the metal sheet. Such a "floating" lug ensures that after the melting of the fuse cut-out formed by the lug, the electrical connection between energy storage cell and connecting element is cut.

More preferably, the current-collecting device is designed in such a way that the lugs are produced from the same material as the surface of the energy storage cell or are coated therewith.

The invention also relates to a method for the production of a current-collecting device comprising at least two energy storage cells and at least one connecting element. The first method step in this case consists of the circumstance that the energy storage cells or at least a part of the energy storage cells are introduced into the perforations of the connecting element, and the lugs make contact with the energy storage cells or the at least one part of the respective energy storage cell. For example, this can be done by mechanical force or can also be achieved by inserting the energy storage cells into the perforation until they contact the lugs.

The next method step consists of the circumstance that each of the lugs makes contact with a probe or a tip of a conductor.

Subsequently, an electrical voltage is applied to the probe or the conductor tips. Of course, this is understood to mean that the electrical voltage is applied each time between two conductor tips for the two lugs belonging to the same perforation. Due to this applied voltage, a current flows from one lug to the other through the head of the energy storage cell, whereby at least a part of the lugs fuse with the energy storage cell and thus a welded joint will be formed.

BRIEF DESCRIPTION OF THE DRAWING

Additional advantages and details of the invention will be explained below based on exemplary embodiments with reference to the drawings. The drawings are schematic representations and show.

DETAILED DESCRIPTION OF THE DRAWING

Figure 1:
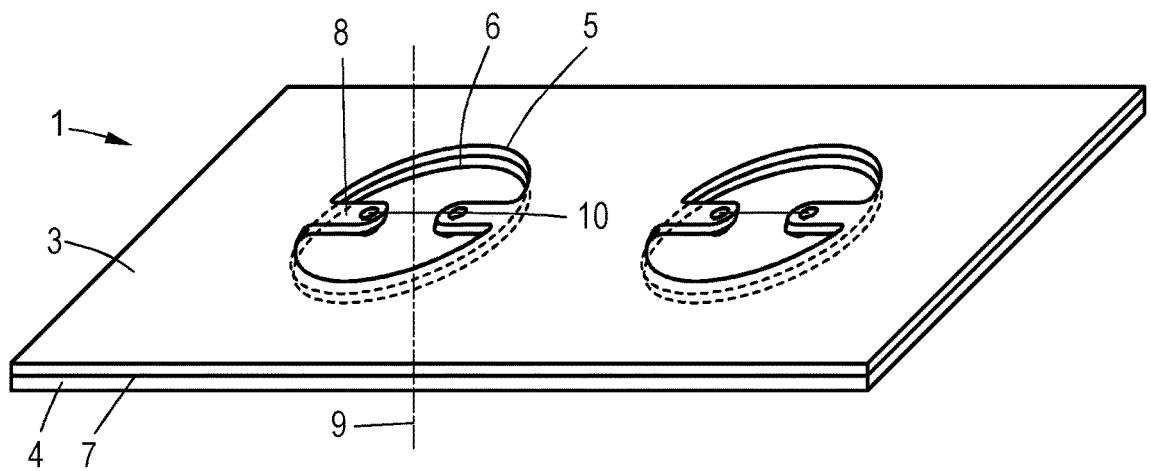
FIG. 1 a perspective excerpt from a connecting element according to the invention.

FIG. 1 shows a perspective excerpt from a connecting element 1 for the electrical connection of energy storage cells 2. The energy storage cells are not shown in FIG. 1 for reasons of clarity.

The connecting element 1 comprises two metal sheets 3, 4, each of which have two perforations 5, 6. The connecting element 1 may comprise, of course, a plurality of perforations 5, 6 in metal sheets 3, 4, for example, depending on the number of energy storage cells 2 to be connected.

The metal sheet 3 is cohesively connected to the metal sheet 4 at the joining site 7. The metal sheets 3, 4 are composed of different metals in this example of embodiment. The metal sheet 3 has lugs 8, which are produced in one piece from the metal sheet 3. The metal sheet 3, and also the metal sheet 4, were produced by punching out. The lugs 8 project into the perforation 5 of the metal sheet 3. According to this exemplary embodiment, the lugs project radially into the perforations 5. The perforations 5, 6 of the connecting element 1 in each case are arranged coaxially. Only two perforations 5, 6 are visible in this case due to the limited excerpt from the connecting element 1 that is shown in FIG. 1.

It is further shown in FIG. 1 that the lugs 8 have a depression 10 on their upper side. The depression 10 is designed for the purpose of accommodating the tips of conductors, by which the lugs 8 are contacted during the production process.

Figure 2:
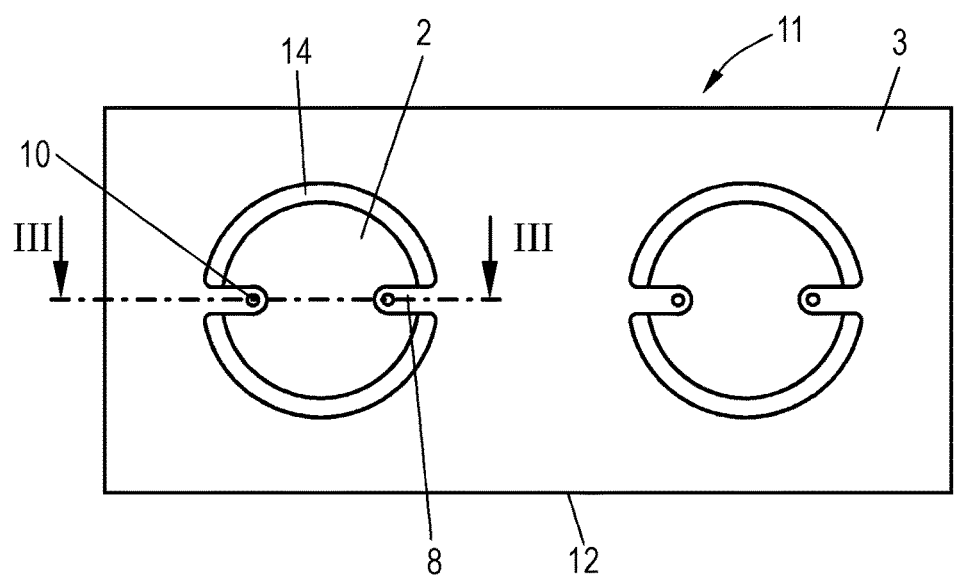
FIG. 2 a top view onto an excerpt from a current-collecting device according to the invention.

FIG. 2 shows an excerpt onto a current-collecting device 11 in a top view. The current-collecting device 11 in this exemplary embodiment has several energy storage cells 2, which are introduced into the perforations 5 of the connecting element 1 of FIG. 1. In order to produce material equality between the lugs 8 and the tops of the energy storage cells 2, the bottoms of lugs 8, thus the side that is facing the energy storage cells 2, are coated. In particular, nickel-plated steel strip has been found to be suitable here as material for the coating.

It is also shown in FIG. 2 that an air gap 14 is formed between the energy storage cells 2 and the perforations 5. The air gap 14 in this case provides an electrical insulation between the energy storage cells 2 and the perforations 5 of the connecting element 1, thus the metal sheet 3.

Figure 3:
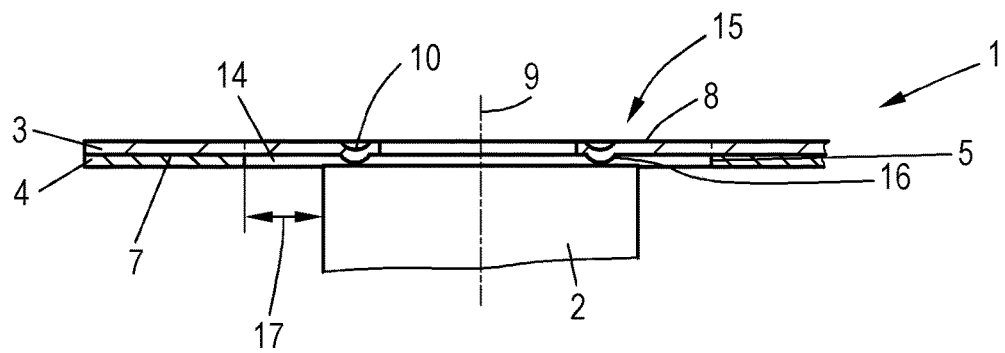
FIG. 3 an excerpt from the current-collecting device according to the invention in a lateral cross section along the cutting line in FIG. 2.

FIG. 3 shows a lateral cross section in the direction of the sectioning plane III-III from FIG. 2 through a part of a current-collecting device 15. The current-collecting device 15 comprises the connecting element 1 from FIG. 1 and a plurality of energy storage cells 2. In this partial excerpt, which is shown in FIG. 3, only the region around one energy storage cell 2 is illustrated for reasons of clarity. In this lateral cross section, the lugs 8 that are formed in one piece with the metal sheet 3 and project into the perforations 5, 6, which are arranged coaxial to one another, can be recognized.

The lugs 8 have protrusions 16 on the side lying opposite to the depressions 10. The connecting element 1 is welded to the top of the energy storage cell 2 by means of these protrusions. Probes, which are not shown in greater detail, were introduced into the depressions 10 for this purpose and an electrical voltage was applied between them. Due to the flow of current resulting therefrom, through the lugs 8, over the top of the energy storage cell 2, at least parts of the lugs were melted and welded to the top of the energy storage cell 2. A cohesive connection of the protrusions 16 to the energy storage cell 2 was achieved thereby. This is particularly advantageously produced for the current-collecting device 15 by a material equality between the metal sheet 3 and the energy storage cell 2.

Further, the air gap 14 between the connecting element and the energy storage cell 2 is visible in FIG. 3. The double arrow 17 indicates the width of the air gap 14.

The air gap 14 makes possible an electrical insulation of the energy storage cell 2 from the connecting element 1. In the exemplary embodiment shown in FIG. 3, the air gap 14 is sufficiently large, so that an electrical insulation remains ensured if the lugs 8 melt due to a current that is greater than the maximum admissible current.

The lugs 8 in this case assume an implicit safety backup function. If the current exceeds a maximum admissible limit value, then the lugs 8 heat up due to the electrical resistance to such an extent that they melt and the electrical connection between energy storage cell 2 and connecting element 1 is interrupted. This is only possible, however, as long as the size of the air gap 14 is sufficient. If the air gap 14 is too small, a bridging of the air gap cannot be excluded, even with a molten lug 8. A solution for an air gap 14 that is too narrow is shown in FIG. 4.

Figure 4:
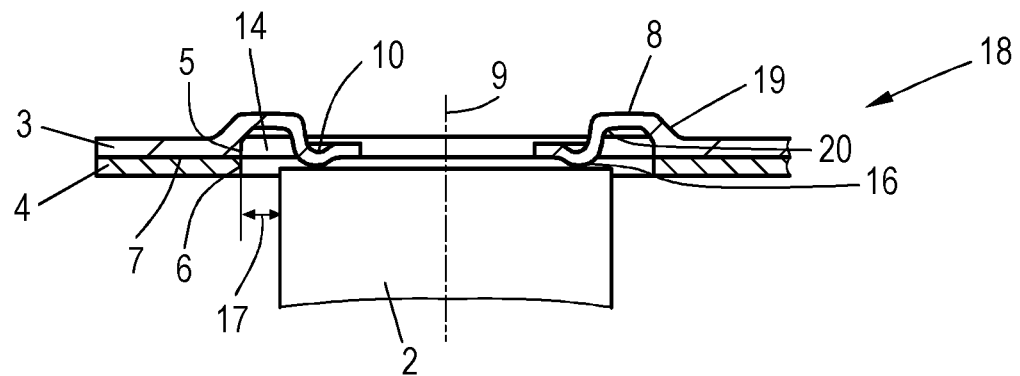
FIG. 4 an excerpt of a current-collecting device according to the invention with floating lugs in a lateral cross section.

FIG. 4 shows a current-collecting device 18 that comprises two metal sheets 3, 4, wherein the metal sheet 3 has lugs 8 that project into the perforation 5. Here, the air gap 14, which is indicated by the double arrow 17, is designed narrower than in the current-collecting device 15 of FIG. 3, for example. In order to ensure an electrical safety backup function of the lugs 8, the latter are designed as a "floating" fuse. For this purpose, the lugs 8 have an elevation 19, by which they project out from the plane of the metal sheet 3. The elevation 19 is designed in this case as a radius. By an oppositely curved radius 20, the lugs 8 are conducted back into the plane of the metal sheet 3, so as to come into contact with the energy storage cell 2. Upon a melting of lugs 8 due to a current that is too high through the current-collecting device 18, the implicit electrical safety backup function remains ensured.

Figure 5:
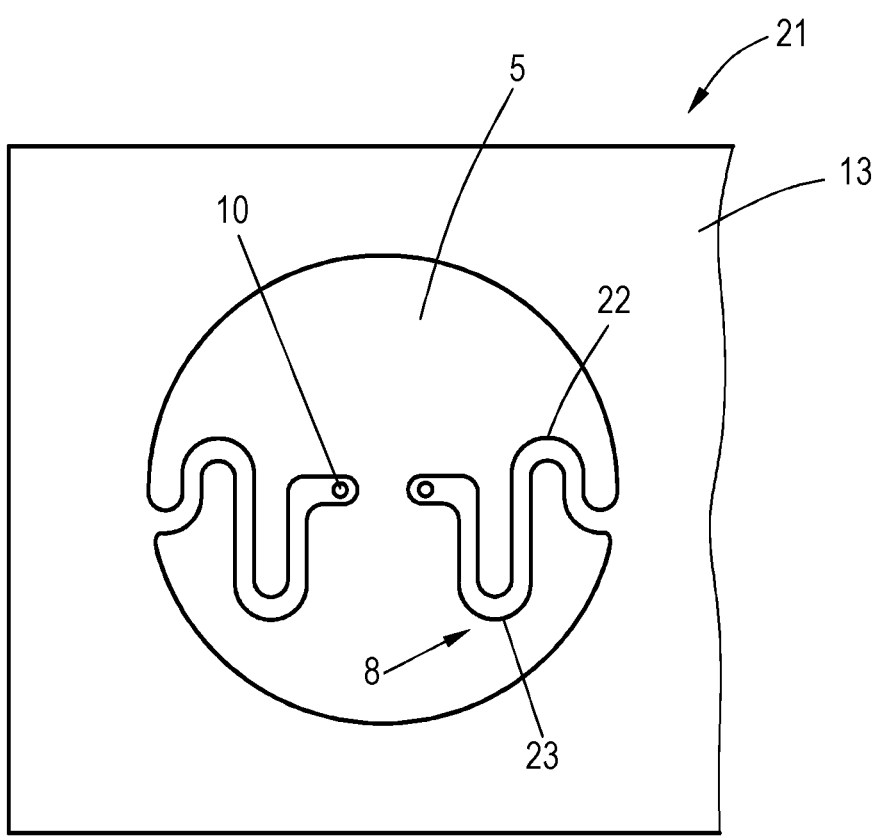
FIG. 5 a top view onto an excerpt from a connecting element according to the invention with S-shaped lugs.

FIG. 5 shows a top view onto an excerpt from a connecting element 21. In the excerpt, the connecting element has two lugs 8, which project into the perforation 5 with the formation of two radii 22, 23. The lugs 8 are produced here in one piece by punching out from the metal sheet 3. The lugs 8 form a safety fuse due to their S-shaped configuration. The connecting element 21 comprises a single metal sheet that is composed of the same material as that of the energy storage cells 2, in order to obtain a cohesive connection. Of course, the connecting element 21 has a plurality of perforations 5 that are not visible due to the limited excerpt.

Figure 6:
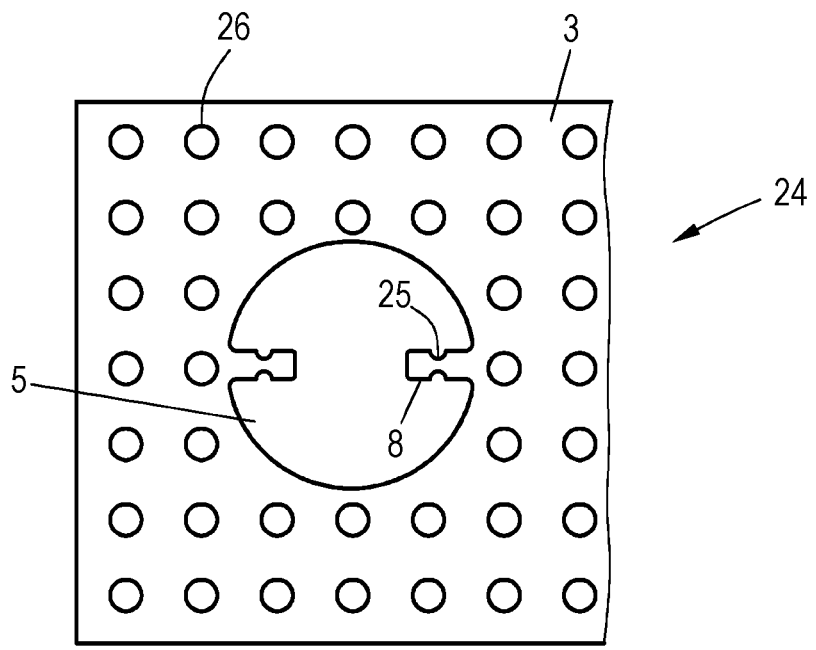
FIG. 6 a top view onto an excerpt from a connecting element according to the invention with two constricted lugs.

FIG. 6 shows a top view onto an excerpt of a connecting element 24. The connecting element 24 has lugs 8 that project into the perforation 5. In this case, only one perforation 5 is illustrated due to the limited excerpt. The lugs 8 have constrictions 25 that reduce the cross section of the lugs 8. Due to this constriction 25, the electrical resistance in the region of the constriction 25 increases. Thus, a type of "predetermined breaking point" is formed that melts when an admissible current value is exceeded and thus ensures an implicit safety fuse function.

It is also shown in FIG. 6 that the connecting element 24 has recesses 26 that are provided for reducing mechanical stresses in metal sheet 3 of the connecting element 24. The connecting element 24 comprises two metal sheets 3, 4, which are joined to one another and are produced from different metals. In order to avoid or to decompose the mechanical stresses that may be produced by the bimetal effect, the recesses 26 are provided in metal sheet 3.

Of course, it is possible to combine in any way all of the properties and features of the connecting elements or current-collecting devices shown individually in FIGS. 1 to 6. Thus, for example, it is possible to form constrictions 25 with the elevations 19 and also with the formation of radii 22 or 23 in a connecting element 1, 12, 21 or 24 having one metal sheet 3 or a plurality of metal sheets 3, 4, 13, and to provide recesses 26.

Figure 7:
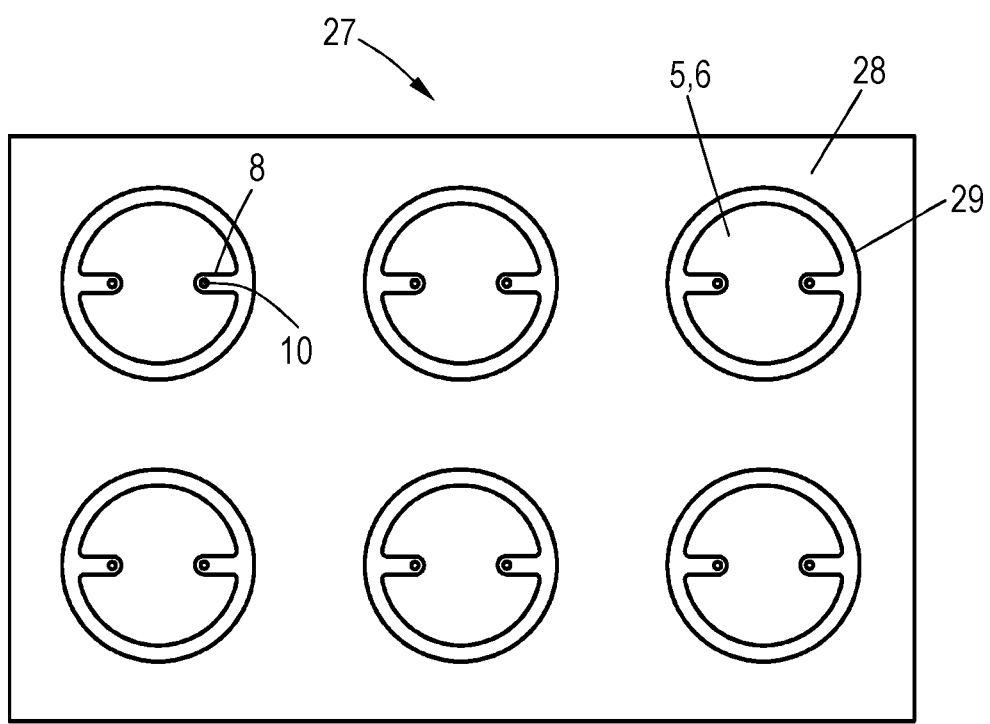
FIG. 7 a top view onto an excerpt of a connecting element according to the invention with two separate metal sheets.

FIG. 7 shows a top view onto an excerpt from an alternative embodiment to the embodiments shown in FIGS. 1 to 6. A connecting element 27 that comprises a first metal sheet 28 and a plurality of second metal sheets 29 is illustrated in FIG. 7. The perforations 5 of the second metal sheets 29 are disposed coaxial to the perforations 6 of the first metal sheet 28. In this case, the second metal sheets 29 are formed as circular metal sheets with the perforation 5 that has lugs 8. A form deviating from the spherical shape is also possible, of course. In this case, the shape of the perforations 5, 6 and of the second metal sheets 29 can be adapted to the shape of the energy storage cells 2. Due to the formation of the second metal sheets 29 as individual sheets, the bimetal effect and the mechanical stresses in the connecting element 27 resulting therefrom are clearly reduced.

Even if this is not explicitly illustrated in FIG. 7, it is also possible, of course, to design lugs 8 of the second metal sheets 29 analogously to the embodiments shown in FIGS. 3 to 6. Further, in all of the figures, the number of perforations 5, 6, as well as the number of metal sheets 3, 4, 28, the number of second metal sheets 29, and the dimensioning of the metal sheets 3, 4, 28, 29 are given by way of example, and can, of course, be selected as desired.

The invention claimed is:

1. A connecting element, comprising:
   at least two metal sheets cohesively joined together for the electrical connection of at least two energy storage cells, wherein the at least two metal sheets have at least two perforations for the uptake in each case of at least a part of an energy storage cell, wherein two lugs provided only on one metal sheet of the at least two metal sheets project into each of the perforations,
   wherein the two lugs project radially into the perforation facing each other,
   wherein the perforations are designed in such a way that an air gap is formed between the energy storage cells and the perforations of the connecting element upon connection therewith so that an electrical insulation between the energy storage cells and the connecting element is formed with the air gap when the lugs melt due to a current, and
   wherein the air gap is formed to have a predetermined width between the energy storage cells and the perforations upon connection therewith,
   wherein the at least two metal sheets cohesively joined together, for which the at least two perforations thereof are arranged coaxially with the predetermined width of the air gap,
   wherein at least one metal sheet of the at least two metal sheets has a plurality of recesses for reducing mechanical stresses in the at least two metal sheets, and
   wherein the at least two metal sheets are composed of different metals, and the plurality of recesses reduce the mechanical stresses caused by a bimetal effect.

2. The connecting element according to claim 1, wherein the lugs are produced in one piece with the one metal sheet of the at least two metal sheets.

3. The connecting element according to claim 1, wherein at least one lug has at least one depression.

4. The connecting element according to claim 3, wherein the lug has a protrusion on a side of the lug that lies opposite to the depression.

5. The connecting element according to claim 1, wherein at least one lug has at least one constriction of its cross section.

6. The connecting element according to claim 1, wherein at least one lug projects into the perforation with the formation of at least two radii.

7. The connecting element according to claim 1, the at least two metal sheets comprise at least a first metal sheet and a second metal sheet, each with the perforation that is arranged coaxial to the perforation of the other, wherein the two lugs that project into the perforation are provided only on the second metal sheet.

8. The connecting element according to claim 1, wherein at least a part of a metal sheet is coated.

9. A current-collecting device comprising at least two energy storage cells and at least one connecting element according to claim 1, wherein the current-collecting device pertains to an entire assembly of a battery pack connected by the at least one connecting element.

10. The current-collecting device according to claim 9, wherein the lugs are produced from the same material as the surface of the energy storage cell or are coated therewith.

11. A method for the production of a current-collecting device according to claim 9, comprising the following steps:
    introducing the at least one part of the energy storage cells into the perforations and contacting the lugs with the energy storage cells;
    contacting each of the lugs with a tip of a conductor; and
    applying an electrical voltage between the conductor tips in order to join at least a part of the lugs to the energy storage cells.

* * * * *